(12) United States Patent  (10) Patent No.: US 7,905,452 B2
Bold  (45) Date of Patent: Mar. 15, 2011

(54) WINDOW FRAME FOR AIRCRAFT

(75) Inventor: Jens Bold, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 253 days.

(21) Appl. No.: 11/568,893

(22) PCT Filed: May 24, 2005

(86) PCT No.: PCT/EP2005/005607
§ 371 (c)(1),
(2), (4) Date: Nov. 14, 2006

(87) PCT Pub. No.: WO2005/115840
PCT Pub. Date: Dec. 8, 2005

(65) Prior Publication Data
US 2007/0075187 A1 Apr. 5, 2007

Related U.S. Application Data

(60) Provisional application No. 60/600,111, filed on Aug. 9, 2004.

(30) Foreign Application Priority Data

May 24, 2004 (DE) .......................... 10 2004 025 375

(51) Int. Cl.
B64C 1/14 (2006.01)
(52) U.S. Cl. ..................................... 244/129.3; 244/131
(58) Field of Classification Search ............... 244/129.3, 244/129.1, 121, 129.4, 131, 132; 52/171.1, 52/204.1, 204.5; 411/270, 267, 510; 296/201, 296/96.21
See application file for complete search history.

(56) References Cited

U.S. PATENT DOCUMENTS 4,364,595 A * 12/1982 Morgan et al. ............. 296/96.11
(Continued)

FOREIGN PATENT DOCUMENTS

DE 4208493 A1 9/1993
(Continued)

Primary Examiner — Tien Dinh
Assistant Examiner — Richard R Green
(74) Attorney, Agent, or Firm — Christopher Paradies; Fowler White Boggs P.A.

(57) ABSTRACT

A window frame for installation in the exterior shell of an aircraft, which comprises one outer flange, an inner flange, and a vertical flange extending between flanges. A window frame is fixed in its position via a plurality of holder elements being arranged substantially equidistance from each other over the periphery of the window frame, being distributed on the outer flange of the window frame. Each of the holder elements comprises a base plate having a face, a pin, a pin extending outwardly from the face of the base plate and a pin to, a downholder clip. The clip may be adapted for a press fit engagement with the pin. The outer surfaces of the pin include a sawtooth-like structure, which engages with hook-shaped clamping elements flexibly formed on the downholder clip and over which an annular locking element is displaced. The holder elements may include a thermoplastic material, which may be provided with reinforcement fibers and may be die cast. Before installation of the window frame in the aircraft, the base plates of the holder elements are adhered to the outer flange of the window frame, and upon mounting of the window frame to an aircraft structure, the outer flange is riveted to an exterior shell of the aircraft.

8 Claims, 4 Drawing Sheets

U.S. PATENT DOCUMENTS

| | | | |
|---|---|---|---|
| 4,739,955 A | | 4/1988 | Aquino et al. |
| 5,040,752 A | * | 8/1991 | Morrison ......................... 248/71 |
| 5,062,248 A | * | 11/1991 | Kunert ............................. 52/208 |
| 5,151,322 A | | 9/1992 | Kimoto et al. |
| 5,243,138 A | * | 9/1993 | Guthke et al. ................ 174/146 |
| 5,271,581 A | * | 12/1993 | Irish ........................... 244/129.3 |
| 6,712,574 B1 | * | 3/2004 | Roopnarine .................. 411/270 |
| 2003/0080252 A1 | * | 5/2003 | Jones ........................ 244/129.3 |
| 2003/0178531 A1 | * | 9/2003 | Hopkins et al. ............ 244/129.3 |

FOREIGN PATENT DOCUMENTS

| | | |
|---|---|---|
| DE | 4208494 C1 | 9/1993 |
| EP | 0262704 A2 | 4/1988 |
| EP | 0376472 A2 | 7/1990 |
| EP | 0287692 B1 | 7/1991 |
| EP | 1342553 A1 | 9/2003 |
| RU | 2091657 C1 | 9/1997 |
| WO | 83/01237 A1 | 4/1983 |

* cited by examiner

WINDOW FRAME FOR AIRCRAFT

REFERENCE TO RELATED APPLICATIONS

This application claims the benefit of the filing date of U.S. Provisional Patent Application No. 60/600,111 filed Aug. 9, 2004, the disclosure of which is hereby incorporated herein by reference and of the German Patent Application DE 10 2004 025 375 filed May 24, 2004, the disclosure of which is hereby incorporated herein by reference.

FIELD OF THE INVENTION

The field relates to a window frame for installation in the exterior shell of an aircraft.

BACKGROUND OF THE INVENTION

In most of the aircraft made and in operation today, window frames made of aluminum are used, and comprise a part which is made by forging, truing and cupping. The window frame is organized into a total of three regions: an outer flange, an inner flange, and a vertical flange extends between these two flanges. The window frames may be connected with two rows of rivets over the outer flange with an aircraft structure or with an exterior shell of the aircraft. A window element may rest on the inner flange, which typically comprises two panes and a sealing arranged therebetween and which is fixed in its position via a retainer or a downholder, which is connected with the window frame. This downholder is formed generally as a closed oval, whose shape is adapted to each window frame and is made by deep drawing from an aluminum material.

SUMMARY OF THE INVENTION

It may be one object to provide a window frame, which has reduced weight in comparison to the window frames used today for this application and, at the same time, may be made and mounted as simply and most cost-effectively as possible.

According to an exemplary embodiment, a window frame comprises an outer flange, an inner flange, and a vertical flange is provided, wherein the vertical flange extends between the outer and inner flanges. The connection of the window frame with the aircraft structure may take place via the outer flange. A window element abuts against at least one of the inner flange and the vertical flange and may be fixed into its position via at least one holder element connected with the window frame.

According to an aspect of the present invention, a plurality of holder elements are arranged substantially equidistance from each other over the periphery of the window frame and being distributed on the outer flange. The holder elements, respectively, may comprise a base plate having a face, a pin extending outwardly from the face of the base plate, as well as a downholder clip that may engage the pin in a press fit or form fit manner.

By using clip-like holder elements made from a thermoplastic material distributed discretely over the periphery of the window frame, which also may include reinforcement fibers, a weight savings of approximately 20 percent may be achieved. In spite of this great weight savings potential, the costs for such a component, compared to a window frame made from an aluminum forged part, are believed to not rise. At the same time, a simple and fast mounting of the window element may be possible. In particular, the elements may be suited for use in connection with window frames, which are made from a fiber-reinforced synthetic resin, whereby even further substantial weight savings may be achieved.

BRIEF DESCRIPTION OF THE FIGURES

Next, the window frame will be described in greater detail with reference to one embodiment shown in the accompanying figures. In the figures.

DETAILED DESCRIPTION

The examples described and drawings rendered are illustrative and are not to be read as limiting the scope of the invention as it is defined by the appended claims.

Figure 1:
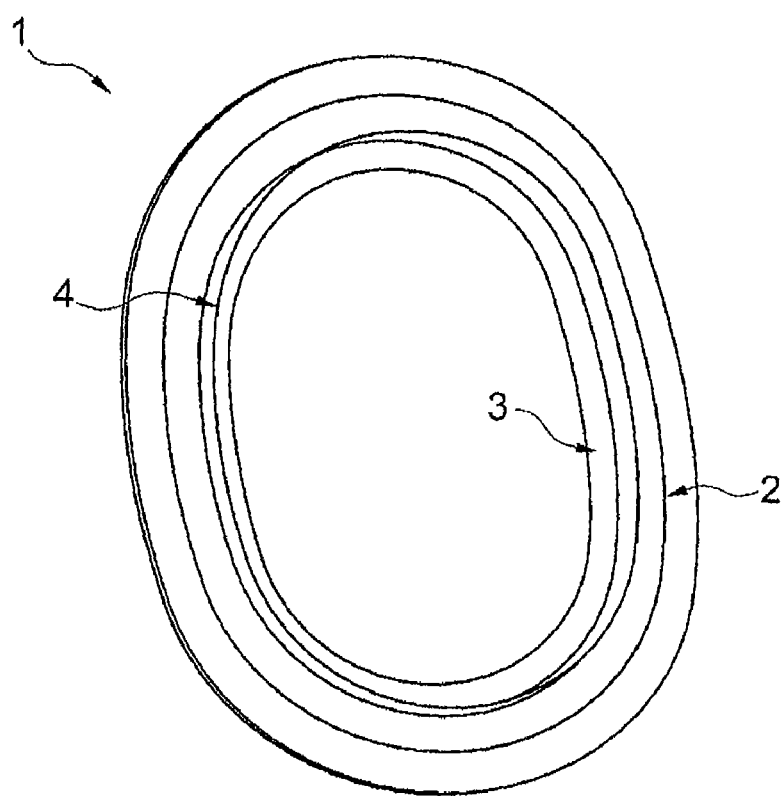
FIG. 1 shows a window frame in perspective view.
Figure 2:
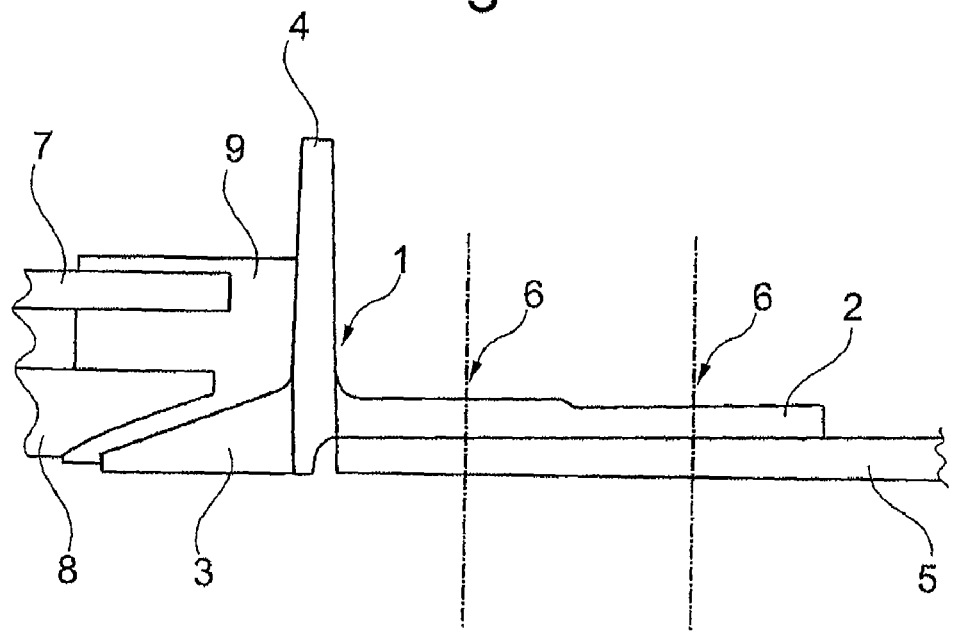
FIG. 2 shows a detail section through the installation position of a window frame of FIG. 1.
Figure 3:
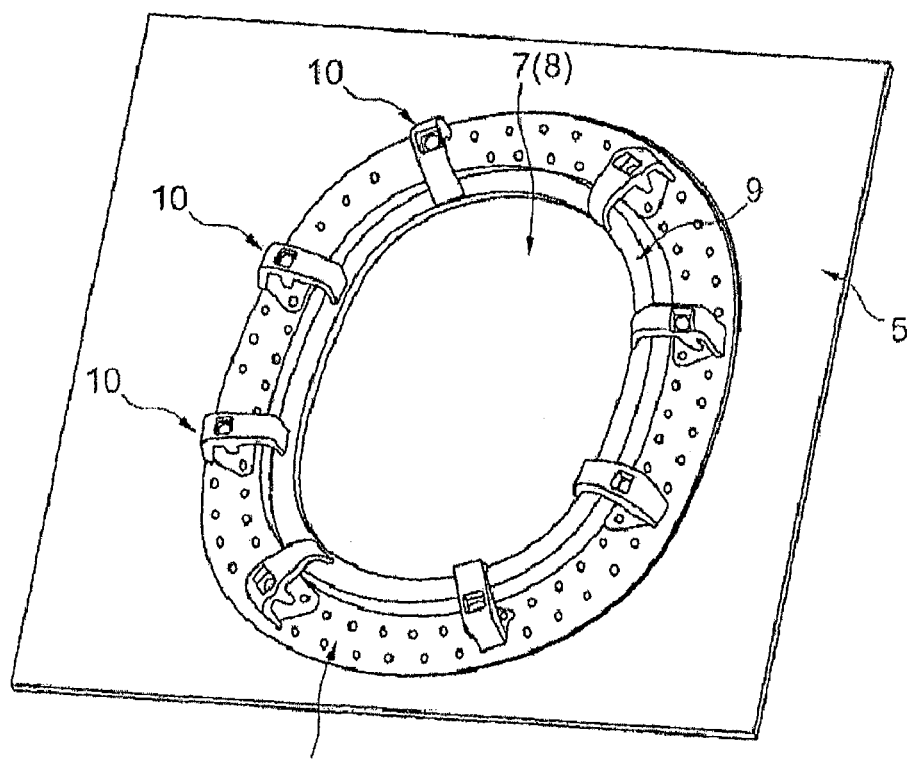
FIG. 3 shows a window frame in its installed position in the exterior shell of an aircraft in perspective view.
Figure 4:
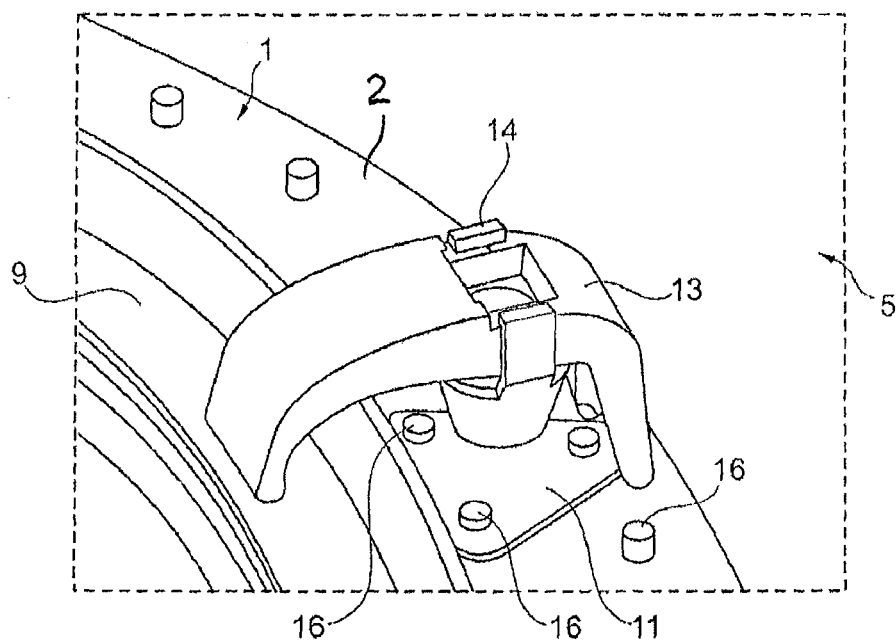
FIG. 4 shows an enlarged detail representation of the arrangement of FIG. 3.
Figure 5:
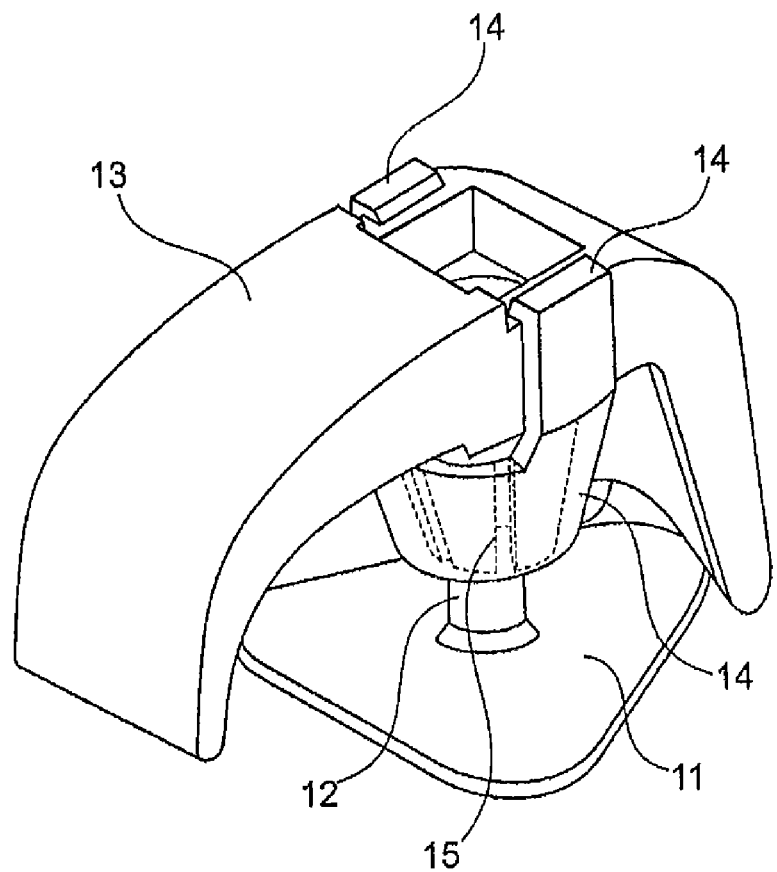
FIG. 5 shows a holder element in its installed position in perspective representation.

The window frame 1 shown in FIG. 1 has three different regions; specifically, these are an outer flange 2, an inner flange 3, as well as a vertical flange 4 arranged between these two flanges. FIG. 2 shows, in a detail section, the installed position of this window frame 1 in the exterior shell 5 of an aircraft. In this figure, there are rivet positions 6 for the connection of the frame with the exterior shell 5, as well as two window panes 7 and 8, which together with the sealing 9 form the window element. As shown in FIGS. 3 and 4, the window element is fixed in its installed position by a plurality of clip-like holder elements distributed substantially uniformly over the periphery of the window frame.

The structure of the holder element 10 is shown in detail in FIGS. 5 through 8. The holder elements 10 consist of a thermoplastic material, which can be provided according to specification heights also with reinforcement fibers, and are made by die casting. Each of the holder elements 10 made in this manner comprises multiple individual parts. These are a base plate 11 with a pin 12 extending outwardly from the face of the base plate. The outer surface pin includes is provided a sawtooth-like structure, and engages actual downholder clip 13 as well as a locking or securing device 14.

Figure 6:
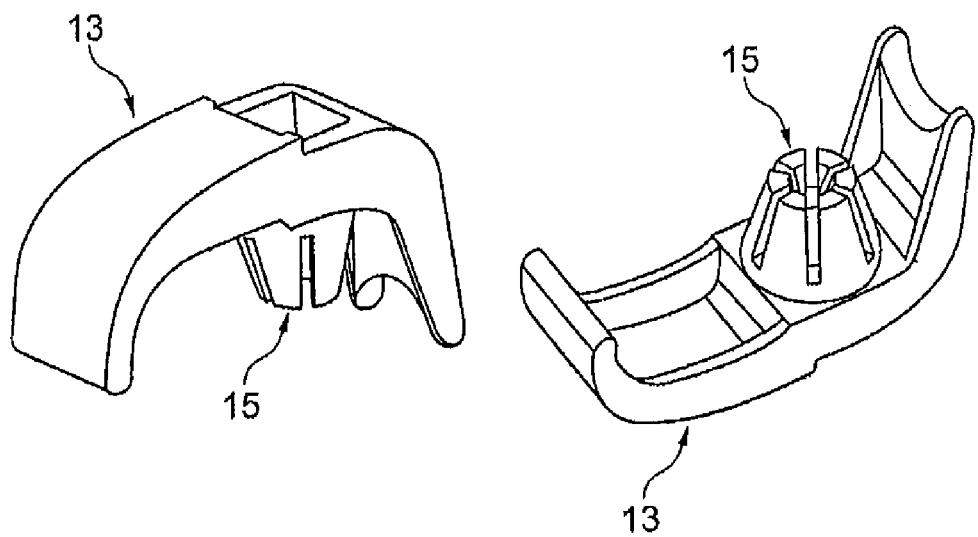
FIGS. 6 and 7 show details of a holder element of FIG. 5.
Figure 7:
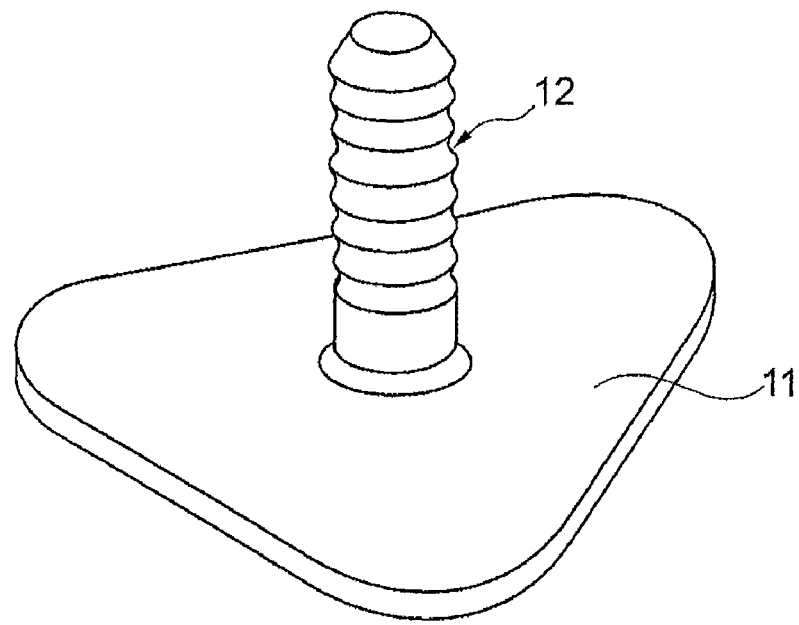
Figure 8:
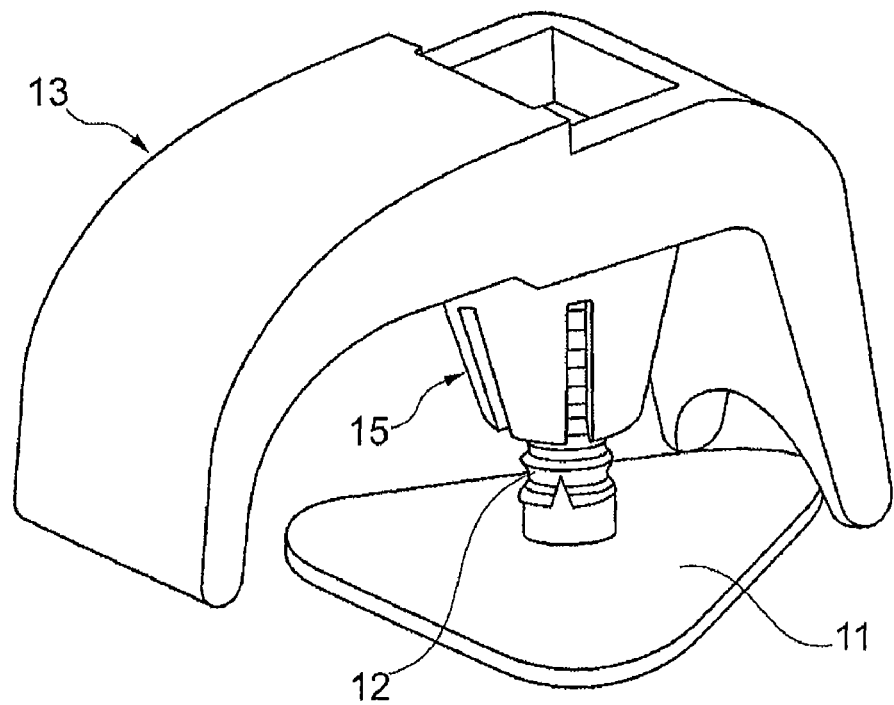
FIG. 8 shows a holder element before fixing.

The downholder clip 13, as shown in FIG. 6, is formed in a C-shape and has flexible, hook-shaped clamping elements 15, positioned substantially near the center or at the center which allows a locking snap connection with the pin 12. Upon mounting of the holder elements 10, the downholder clips 13 are pressed over the pin 12, whereby the clamping elements 15 come into engagement with the pin 12 with the sawtooth-like undercuts. In order to prevent an unwanted loosening of this connection, the clamping elements are fixed by means of the locking element, such as an annular locking element 14 surrounding them, whereby a releasable redundant and positive-fit connection between the downholder clip 13 and the pin 12 is provided, through which the sealing 9 of the window elements, and therewith, the window elements are fixed and held in their installed position.

The holder elements 10 may be suited, in particular, for use in connection with window frames 1, which are made from fiber-reinforced synthetic resin. In this case, the base plates 11 of the holder elements 10 (shown in FIGS. 7-8) are already adhered to the window frames 1 and upon mounting of the window frames in the aircraft, and the outer flange is riveted to 1 with the exterior shell 5 of the aircraft, as shown, in particular, in FIG. 4. From the rivets 16, which create the connection of the window frames 1 with the exterior shell 5 of the aircraft, three rivets 16 are arranged in the region of each base plate 11 in the case of the embodiment described here.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Alternative combinations and variations of the examples provided will become apparent based on this disclosure. It is not possible to provide specific examples for all of the many possible combinations and variations of the embodiments described, but such combinations and variations may be claims that eventually issue.

The invention claimed is:

1. A window frame for installation in an exterior shell of an aircraft, the frame comprising:
   an outer flange;
   an inner flange;
   a vertical flange;
   a window element;
   wherein the vertical flange extends between the outer and inner flanges, the outer flange being adapted for forming a connection to an aircraft structure, for connecting the window frame to the aircraft structure, the window element abutting against at least one of the inner flange and the vertical flange; and a plurality of holder elements, each holder element of the plurality of holder elements comprising:
      a base plate having a first face with a pin extending outwardly from the first face of the base plate, the pin having an outer circumferential surface including a plurality of sawtooth structures, and having a second face, facing opposite from the first face, in direct contact with a surface of the outer flange of the window frame and fixed on the surface of the outer flange of the window frame, wherein the base plate with the pin is a first individual part of the holder element; and
      a downholder clip having an outer clamping end and a plurality of inner flexible clamping elements, the plurality of inner flexible clamping elements retainably engaging the plurality of sawtooth structures of the pin of the base plate when the downholder clip is press fit on the pin, such that the plurality of inner flexible clamping elements of the downholder clip form a locking snap connection with the plurality of sawtooth structures of the pin, wherein the downholder clip with the plurality of inner flexible clamping elements is a second individual part of the holder element separate from the first individual part, and when the plurality of inner flexible clamping elements of the downholder clip are press fit onto the plurality of sawtooth structures of the pin, the outer clamping end of the downholder clip engages the window element, fixing the window element within the window frame.

2. The window frame of claim 1, wherein each of the plurality of holder elements further comprises:
   an annular locking element, and the annular locking element fits over the plurality of inner flexible clamping elements of each of the plurality of holder elements
   wherein the plurality of inner flexible clamping elements are locked onto the pin by the annular locking element preventing loosening of the downholder clip from the pin;
   wherein the locking element is a third individual part of the holder element separate from both the first individual part and the second individual part.

3. The window frame of claim 1, wherein the plurality of the holder elements comprise a thermoplastic material.

4. The window frame of claim 3, wherein the thermoplastic material comprises reinforcement fibers.

5. The window frame of claim 1, wherein the downholder clip of each of the plurality of holder elements is die cast.

6. The window frame of claim 1,
   wherein the second surface of the base plate of each of the plurality of holder elements is adhered to the surface of the outer flange of the window frame and the outer flange is riveted to the exterior shell of the aircraft by rivets passing through the surface of the outer flange of the window frame.

7. The window frame of claim 6, wherein the rivets pass through the base plate of each of the plurality of holder elements fixing the base plate to the surface of the outer flange.

8. The window frame of claim 1,
   wherein each of the plurality of flexible clamping elements of the downholder clip of each of the plurality of holder elements is hook-shaped and is separated by a slot from each of the neighboring ones of the plurality of flexible clamping elements.

* * * * *